United States Patent
Wang et al.

(10) Patent No.: US 9,713,106 B2
(45) Date of Patent: Jul. 18, 2017

(54) METHOD, BASE STATION AND COMPUTER STORAGE MEDIUM FOR IMPLEMENTING INNER LOOP AND CLOSED LOOP POWER CONTROL

(71) Applicant: ZTE Corporation, Shenzhen, Guangdong (CN)

(72) Inventors: Meiying Wang, Shenzhen (CN); Jiewei Ding, Shenzhen (CN); Tao Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/783,380

(22) PCT Filed: Mar. 24, 2014

(86) PCT No.: PCT/CN2014/073980
§ 371 (c)(1),
(2) Date: Oct. 8, 2015

(87) PCT Pub. No.: WO2014/166333
PCT Pub. Date: Oct. 16, 2014

(65) Prior Publication Data
US 2016/0057715 A1    Feb. 25, 2016

(30) Foreign Application Priority Data
Apr. 12, 2013   (CN) .......................... 2013 1 0127941

(51) Int. Cl.
H04W 52/40 (2009.01)
H04W 52/08 (2009.01)
(Continued)

(52) U.S. Cl.
CPC .......... H04W 52/40 (2013.01); H04W 52/08 (2013.01); H04W 52/146 (2013.01);
(Continued)

(58) Field of Classification Search
CPC ... H04W 52/40; H04W 52/146; H04W 36/18; H04W 52/241; H04W 52/325;
(Continued)

(56) References Cited

U.S. PATENT DOCUMENTS 7,477,899 B2    1/2009  Vasudevan
2006/0166673 A1  7/2006  Vasudevan
(Continued)

FOREIGN PATENT DOCUMENTS

CN   1681221 A      10/2005
WO   2012112868 A1  8/2012

OTHER PUBLICATIONS

International Search Report in international application number: PCT/CN2014/073980, mailed on Jun. 30, 2014.
(Continued)

*Primary Examiner* — Keith Ferguson
(74) *Attorney, Agent, or Firm* — Oppedahl Patent Law Firm LLC

(57) ABSTRACT

Provided are a method, a base station and a computer storage medium for implementing inner loop and closed loop power control. The method includes that when User Equipment (UE) is in a soft handover status, a cell which belongs to a Radio Link Set (RLS) different from that of a serving cell of the UE sends a fixed power control instruction to instruct the UE to increase transmission power.

12 Claims, 5 Drawing Sheets

(51) Int. Cl.
*H04W 52/14* (2009.01)
*H04W 36/18* (2009.01)
*H04W 52/24* (2009.01)

(52) U.S. Cl.
CPC .......... *H04W 52/244* (2013.01); *H04W 36/18* (2013.01); *H04W 52/241* (2013.01)

(58) Field of Classification Search
CPC ... H04W 16/10; H04W 52/12; H04W 52/244; H04W 52/245
USPC ...... 455/522, 69, 450, 423, 436–445, 422.1, 455/403, 67.11, 63.13, 550.1, 507, 508, 455/56, 426.1, 426.21; 370/329, 331, 370/252, 328, 318, 338
See application file for complete search history.

(56) References Cited

U.S. PATENT DOCUMENTS

| | | | |
|---|---|---|---|
| 2012/0213092 A1* | 8/2012 | Sun | H04W 52/244 370/248 |
| 2013/0188608 A1* | 7/2013 | Balachandran | H04W 36/30 370/335 |

OTHER PUBLICATIONS

English Translation of the Written Opinion of the International Search Authority in international application No. PCT/CN2014/073980, mailed on Jun. 30, 2014.
3rd Generation Partnership Project;Technical Specification Group Radio Access Network; Physical layer procedures (FDD)(Release 10),mailed on Mar. 2014.
3rd Generation Partnership Project;Technical Specification Group Radio Access Network; Medium Access Control (MAC) protocol specification(Release 10),mailed on Dec. 2012.
Supplementary European Search Report in European application No. 14783100.2, mailed on Mar. 18, 2016.
Renesas Mobile Europe Ltd: "Discussion on Uplink Control Issues in UMTS Heterogeneous Networks", 3GPP Draft; RI-125045 Discussion on Uplink Control Signaling Issues in Hetnet, 3rd Generation Partnership Project (3GPP), Mobile Competence Centre; 650, Route Des Lucioles ; F-06921 Sophia-Antipolis, vol. RAN WG1, No. New Orleans, USA; 20121112-20121116, Nov. 2, 2012, XP050662703, Retrieved from the Internet URL: http://www.3gpp.org/ftp/tsg ran/WG1 RL1/TSGR1 71/Docs/ {retrieved on Nov. 2, 2012)*p. 1, last paragragh ** p. 2; figure 1 *,mailed on Nov. 2, 2012.

* cited by examiner

METHOD, BASE STATION AND COMPUTER STORAGE MEDIUM FOR IMPLEMENTING INNER LOOP AND CLOSED LOOP POWER CONTROL

TECHNICAL FIELD

The disclosure relates to a power control technology, and more particularly to a method, a base station and a computer storage medium for implementing inner loop and closed loop power control.

BACKGROUND

The service provided for each user by a wireless cellular network needs to meet certain Quality of Service (QoS) requirement; and the QoS mainly depends on the Signal-to-Interference Ratio (SIR) of the signal received by each user. With a Wideband Code Division Multiple Access (WCDMA) system as an example, respective users in a same cell occupy the same frequency band and time and are isolated from one another only by the orthogonality of spreading codes. Whereas, due to multiple paths, delay and the like of a wireless channel, the cross correlation among the users is not ideal, and other users may interfere the current user. Thereby, more interference may be caused to the current user and the SIR of the signal received by the current user may decrease when the number of users in the cell or the power of other users increases; and when the interference reaches a certain extent, the current user cannot communicate normally. Therefore, the WCDMA system is severely limited by the interference, and the magnitude of the interference directly affects the capacity of the system. To solve the problem, the 3rd Generation Partnership Project (3GPP) protocol defines several power control methods; and the power control aims to adjust the transmission power of each user to compensate for channel fading and offset near-far effect and further aims to maintain the transmission power of each user to be above the minimum standard required by the communication, thus, the interference to other users can be reduced greatly, and accordingly, the capacity of the system is improved.

The inner loop and closed loop power control of a WCDMA system is completed by User Equipment (UE) and a cell in an active set, as shown in FIG. 1, the process is as follows: the cell measures the SIR of an uplink Dedicated Physical Channel (DPCH) in real time, and compares the measured SIR with a target SIR (SIR_target); and if the measured SIR is smaller than the SIR_target, it is indicated that the uplink channel quality is poor, and the cell sends a power control instruction to instruct the UE to increase the transmission power. On the contrary, if the measured SIR is greater than the SIR_target, it is indicated that the uplink channel quality is better than expected quality, and the cell sends a power control indication to instruct the UE to decrease the transmission power in order to save power resources, decrease the interference to other users and improve the capacity of the system. When in a soft handover status, the UE communicates with multiple cells at the same time, so the UE may receive different power control commands. In such a circumstance, the UE may decrease the transmission power only if one power control indication requires the UE to decrease the transmission power; and the UE may not increase the transmission power until all the power control instructions received by the UE require the UE to increase the transmission power.

In the existing inner loop and closed loop power control method, if the UE is in the soft handover status, when an uplink and a downlink are unbalanced, the decoding of an uplink control channel, particularly decoding of an uplink High Speed Dedicated Physical Control Channel (HS-DPCCH) of the serving High-Speed Downlink Shared Channel (HS-DSCH) cell may become unreliable, which affects the QoS.

For example, in a Heterogeneous Network (HetNet), when the UE is in a soft handover area of a macro NodeB and a low power NodeB, and the serving HS-DSCH cell of the UE is a cell in the macro NodeB, the signal received by the low power NodeB from the UE may be much better than that received by the macro NodeB from the UE due to the unbalance between the uplink and the downlink. Then, it is possible that the inner loop and closed loop power control indication received by the UE from the cell in the macro NodeB requires the UE to increase the transmission power, but the inner loop and closed loop power control indication received by the UE from the cell in the low power NodeB requires the UE to decrease the transmission power. According to the existing inner loop and closed loop power control combination principle, the UE may decrease the transmission power only if one power control indication received by the UE requires to decrease the transmission power, so the signal received by the macro NodeB from the UE may become worse. At the moment, the decoding of an uplink control channel, particularly that of an HS-DPCCH of the serving HS-DSCH cell from the UE to the macro NodeB is unreliable, which affects the QoS of the HSDPA seriously. This is because the HS-DPCCH contains a hybrid automatic repeat acknowledgement message (generally represented by ACK/NACK) and downlink Channel Quality Indicator (CQI) information, the decoding error of the ACK/NACK may cause the packet loss of High Speed Downlink Packet Access (HSDPA) or add unnecessary retransmission, and the decoding error of the CQI may cause the block scheduled by the HSDPA to become too large to be decoded correctly or become too small to waste resources.

In a word, according to the existing inner loop and closed loop power control method, when UE is in a soft handover process and an uplink and a downlink are unbalanced, it is possible that the decoding of an uplink control channel, particularly the decoding of an HS-DPCCH of a serving HS-DSCH cell is unreliable, thereby affecting the QoS.

SUMMARY

In view of this, embodiments of the disclosure provide a method and a base station for implementing inner loop and closed loop power control, and a computer storage medium, in order to reduce the adverse effect of a non-serving cell on UE, solve the problem of unreliable decoding of an uplink control channel, particularly that of an HS-DPCCH of a serving HS-DSCH cell, and improve the QoS of HSDPA.

To this end, the technical solutions of the embodiments of the disclosure are implemented as follows.

An embodiment of the disclosure provides a method for implementing inner loop and closed loop power control, including: when UE is in a soft handover status, a cell which belongs to a Radio Link Set (RLS) different from that of a serving cell of the UE sends a fixed power control instruction to instruct the UE to increase transmission power.

Preferably, the fixed power control instruction may be irrelevant to a SIR actually measured and may refer to a fixed power control instruction for instructing the UE to increase the transmission power.

Preferably, the method may further include: when the UE is not in the soft handover status, a cell communicating with the UE measures a SIR of an uplink DPCH in real time and compares the measured SIR with a target SIR; when the measured SIR is smaller than the target SIR, the cell communicating with the UE sends a power control instruction to instruct the UE to increase the transmission power; and when the measured SIR is greater than the target SIR, the cell communicating with the UE sends a power control instruction to instruct the UE to decrease the transmission power.

Preferably, the method may further include: when the UE is in the soft handover status, if a cell communicating with the UE is the serving cell of the UE or belongs to a same RLS with the serving cell of the UE, the cell communicating with the UE measures the SIR of the uplink DPCH in real time, combines the measured SIR with SIRs of other cells in the same RLS, and compares the combined SIR with the target SIR; when the combined SIR is smaller than the target SIR, the cell communicating with the UE sends a power control instruction to instruct the UE to increase the transmission power; and when the combined SIR is greater than the SIR_target, the cell communicating with the UE sends a power control instruction to instruct the UE to decrease the transmission power.

An embodiment of the disclosure further provides a base station for implementing inner loop and closed loop power control, including function modules for executing the steps of the method for implementing inner loop and closed loop power control.

Preferably, the base station may include a judgement unit, a first determining unit and a first control unit, wherein the judgement unit is configured to judge whether UE is in a soft handover status;

the first determining unit is configured to, when the UE is in the soft handover status, determine a cell which belongs to an RLS different from that of a serving cell of the UE; and the first control unit is configured to control the cell which belongs to the RLS different from that of the serving cell of the UE to send a fixed power control instruction to instruct the UE to increase the transmission power.

Preferably, the fixed power control instruction may be irrelevant to a SIR actually measured and may refer to a fixed power control instruction for instructing the UE to increase the transmission power.

Preferably, the base station may further include a second determining unit and a second control unit, wherein the second determining unit is configured to, when the UE is not in the soft handover status, determine a cell communicating with the UE; and the second control unit is configured to, when the UE is not in the soft handover status, control the cell communicating with the UE to measure a SIR of an uplink DPCH in real time and compare the measured SIR with a target SIR, when the measured SIR is smaller than the SIR_target, control the cell communicating with the UE to send a power control instruction to instruct the UE to increase the transmission power, and when the measured SIR is greater than the SIR_target, control the cell communicating with the UE to send a power control instruction to instruct the UE to decrease the transmission power.

Preferably, the base station may further include a third determining unit and a third control unit, wherein the third determining unit is configured to, when the UE is in the soft handover status, determine whether a cell communicating with the UE is the serving cell of the UE or belongs to a same RLS with the serving cell of the UE; and the third control unit is configured to, when the third determining unit determines that the cell communicating with the UE is the serving cell of the UE or belongs to the same RLS with the serving cell of the UE, control the cell communicating with the UE to measure the SIR of the uplink DPCH in real time, combine the measured SIR with SIRs of other cells in the RLS, and compare the combined SIR with the target SIR;

when the combined SIR is smaller than the target SIR, control the cell communicating with the UE to send a power control instruction to instruct the UE to increase the transmission power;

when the combined SIR is greater than the target SIR, control the cell communicating with the UE to send a power control instruction to instruct the UE to decrease the transmission power.

An embodiment of the disclosure further provides a computer storage medium, which stores a computer program which is configured to execute the method for implementing inner loop and closed loop power control.

According to the method, the base station and the computer storage medium for implementing inner loop and closed loop power control provided by the embodiments of the disclosure, when UE is in a soft handover status, a cell which belongs to an RLS different from that of a serving cell of the UE is controlled to send a fixed power control instruction to instruct the UE to increase the transmission power, so that the adverse effect of a non-serving cell on the UE is limited effectively, the problem of unreliable decoding of an uplink control channel, particularly unreliable decoding of an HS-DPCCH of a serving HS-DSCH cell is solved, and the QoS of an HSDPA is improved. The technical solutions of the embodiments of the disclosure can be applied to any soft handover scenario, the implementation is simple, and no additional software and hardware resources are needed.

DETAILED DESCRIPTION

To describe the technical problem to be solved, the technical solutions and advantages of the disclosure more clearly, the disclosure is described below in combination with the accompanying drawings and embodiments in detail. It should be understood that the embodiments herein are only intended to explain the disclosure instead of limiting the disclosure.

Figure 1:
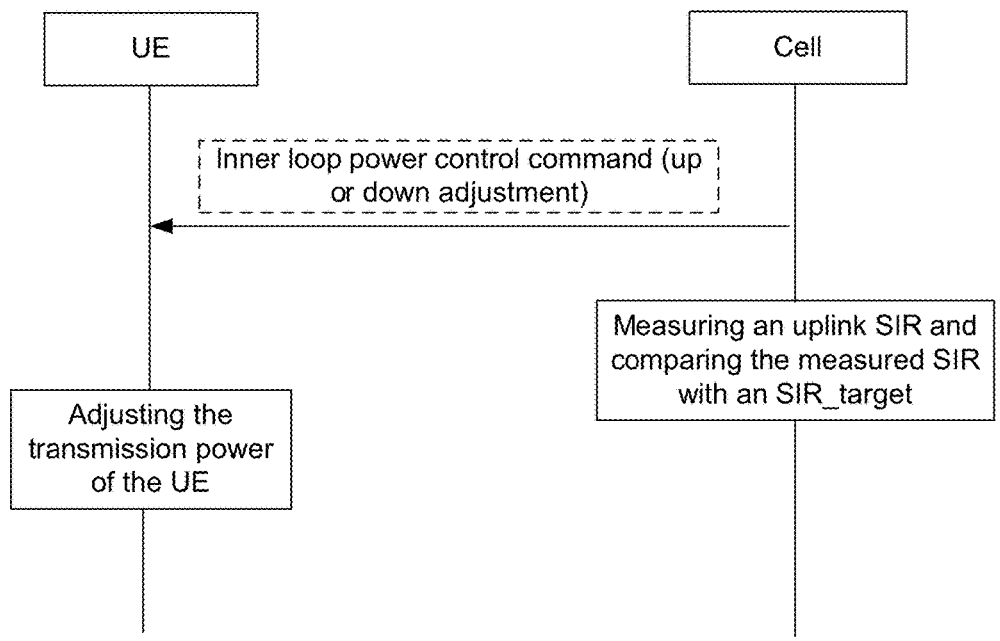
FIG. 1 is a diagram showing an existing inner loop and closed loop power control method.
Figure 2:
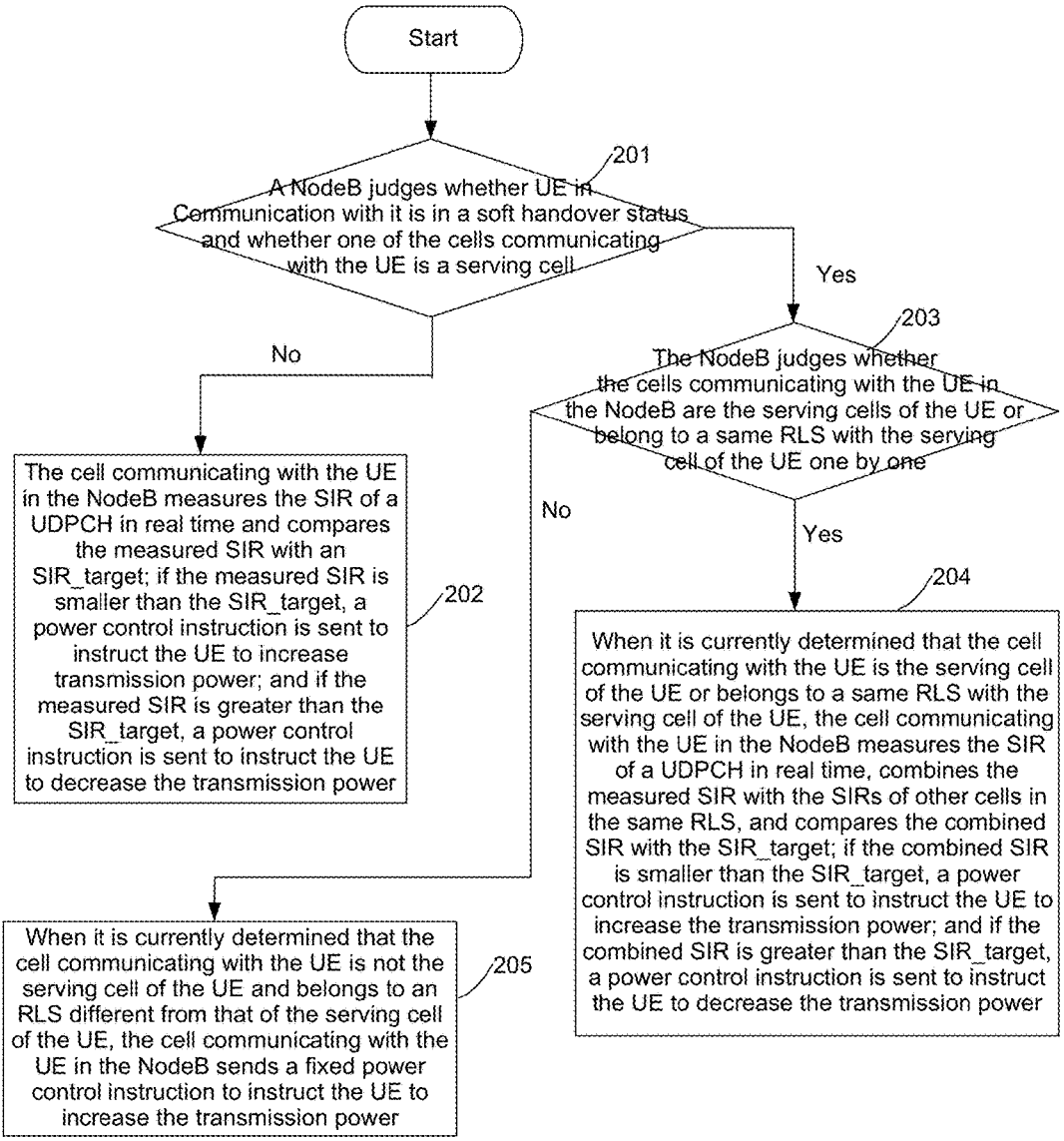
FIG. 2 is a diagram showing a specific implementing flow of a preferred embodiment of a method for implementing inner loop and closed loop power control in an embodiment of the disclosure.

As shown in FIG. 2, which is a diagram showing a specific implementing flow of a preferred embodiment of a method for implementing inner loop and closed loop power control in an embodiment of the disclosure.

It should be noted that the flowchart shown in FIG. 2 is only a preferred embodiment. Those skilled in the art should understand that any embodiment made from the idea of the disclosure should fall within the scope of the technical solutions.

A method for implementing inner loop and closed loop power control, includes: when UE is in a soft handover status, a cell which belongs to an RLS different from that of a serving cell of the UE sends a fixed power control instruction to instruct the UE to increase transmission power.

The example process for inner loop and closed loop power control is gradually implemented below in combination with the embodiment.

Step 201: A NodeB judges whether the UE communicating with it is in a soft handover status and whether one of the cells communicating with the UE is a serving cell.

Specifically, the serving cell may be a serving HS-DSCH cell.

Specifically, if the UE is not in the soft hand-off status or none of the cells communicating with the UE is the serving cell, Step 202 is executed; and if the UE is in the soft hand-off status and one of the cells communicating with the UE is the serving cell, Step 203 is executed.

Step 202: The cell communicating with the UE in the NodeB measures the SIR of an uplink DPCH in real time and compares the measured SIR with an SIR_target; if the measured SIR is smaller than the SIR_target, a power control instruction is sent to instruct the UE to increase transmission power; and if the measured SIR is greater than the SIR_target, a power control instruction is sent to instruct the UE to decrease the transmission power.

Step 203: The NodeB judges whether the cells communicating with the UE in the NodeB are the serving HS-DSCH cells of the UE or belong to a same RLS with the serving cell of the UE one by one.

Specifically, if it is currently determined that the cell communicating with the UE is the serving cell of the UE or belongs to a same RLS with the serving cell of the UE, Step 204 is executed; and if it is currently determined that the cell communicating with the UE is not the serving cell of the UE and belongs to an RLS different from that of the serving cell of the UE, Step 205 is executed.

Step 204: When it is currently determined that the cell communicating with the UE is the serving cell of the UE or belongs to a same RLS with the serving cell of the UE, the cell communicating with the UE in the NodeB measures the SIR of an uplink DPCH in real time, combines the measured SIR with the SIRs of other cells in the same RLS, and compares the combined SIR with a SIR_target; if the combined SIR is smaller than the SIR_target, a power control instruction is sent to instruct the UE to increase the transmission power; and if the combined SIR is greater than the SIR_target, a power control instruction is sent to instruct the UE to decrease the transmission power.

Step 205: When it is currently determined that the cell communicating with the UE is not the serving cell of the UE and belongs to an RLS different from that of the serving cell of the UE, the cell communicating with the UE in the NodeB sends a fixed power control instruction to instruct the UE to increase the transmission power.

It should be noted that, for those skilled in the art, the processing way in Step 204 is not unique, and the preferred way of Step 204 is only described here.

It should be noted that, as a preferred way, the fixed power control instruction described above or below is irrelevant to the SIR actually measured and refers to a fixed power control instruction for instructing the UE to increase the transmission power.

Figure 3:
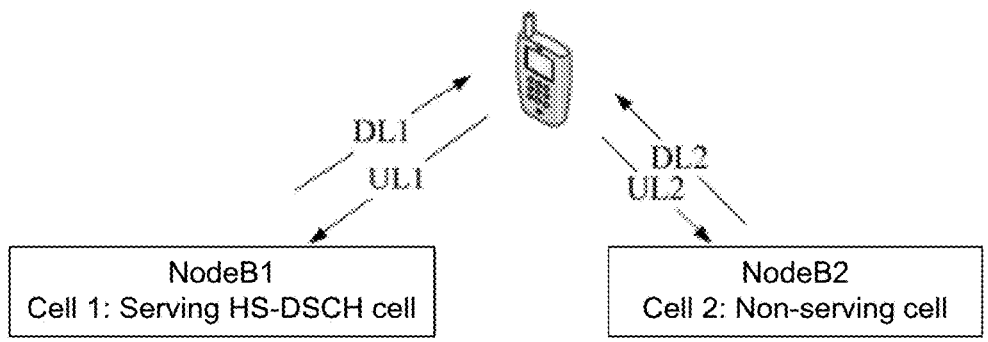
FIG. 3 is a diagram showing an example of uplink and downlink of a signal when UE is in a soft handover status in an embodiment of the disclosure.

FIG. 3 is a diagram showing uplink and downlink of a signal when UE is in a soft handover status in an embodiment of the disclosure. As shown in the figure, the UE is in soft handover areas in NodeB 1 and NodeB 2 and communicates with a cell in the NodeB 1 (cell1) and a cell in the NodeB 2 (cell2), and the cell in the NodeB 1 (cell1) is taken as a serving HS-DSCH cell. The uplink between cell1 and the UE is UL1, and the downlink between cell 1 and the UE is DL1, the uplink between cell 2 and the UE is UL2, and the downlink between cell 2 and the UE is DL2.

Figure 4:
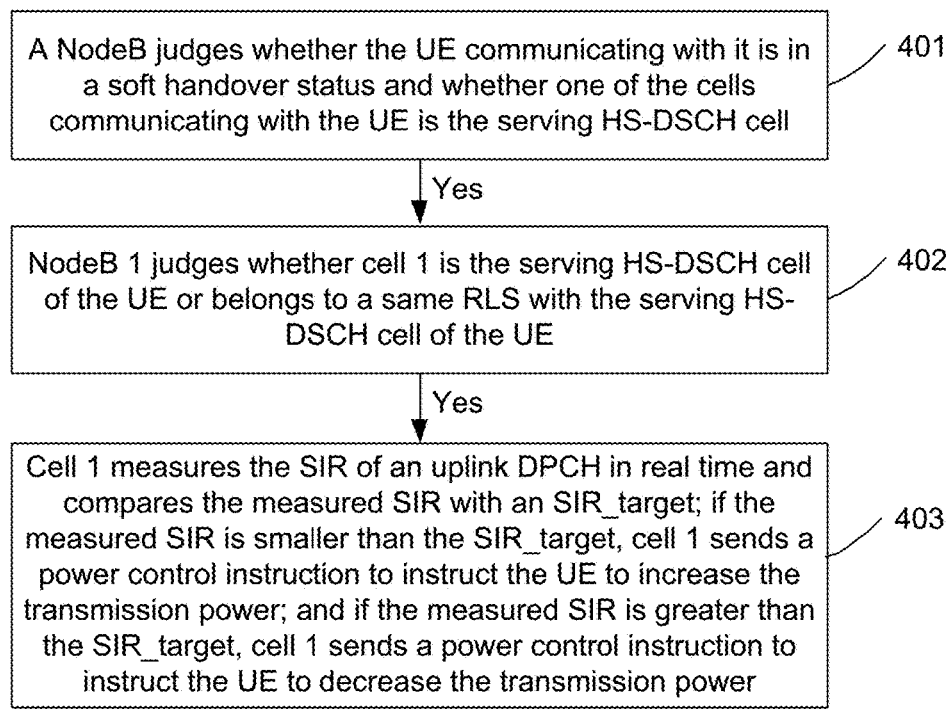
FIG. 4 is a diagram showing a specific implementing flow of a preferred embodiment of an inner loop and closed loop power control method based on a serving cell of UE shown in FIG. 3 in an embodiment of the disclosure.

FIG. 4 is a diagram showing a specific implementing flow of a preferred embodiment of an inner loop and closed loop power control method based on a serving cell of UE shown in FIG. 3 in an embodiment of the disclosure.

Step 401: NodeB1 judges whether the UE communicating with it is in a soft handover status and whether one of the cells communicating with the UE is a serving HS-DSCH cell.

Step 402: NodeB1 judges whether cell 1 is the serving HS-DSCH cell of the UE or belongs to a same RLS with the serving HS-DSCH cell of the UE.

It should be noted that, when multiple cells (such as cell 1, cell X and so on) in the NodeB1 communicate with the UE, NodeB1 judges whether cell 1, cell X and the like are serving HS-DSCH cells of the UE or belong to a same RLS with the serving HS-DSCH cell of the UE one by one.

Step 403: Based on the example shown in FIG. 3, cell 1 is the serving HS-DSCH cell of the UE and only cell 1 in NodeB1 communicates with the UE. Therefore, here, cell 1 measures the SIR of an uplink DPCH in real time and compares the measured SIR with an SIR_target; if the measured SIR is smaller than the SIR_target, cell 1 sends a power control instruction to instruct the UE to increase the transmission power; and if the measured SIR is greater than the SIR_target, cell 1 sends a power control instruction to instruct the UE to decrease the transmission power.

It should be noted that, when multiple cells (such as cell 1, cell X and the like) in the NodeB1 communicate with the UE, here, cell 1 and cell X are the serving HS-DSCH cells of the UE or belong to a same RLS with the serving HS-DSCH cell of the UE, the SIR of the uplink DPCH is measured in real time and then combined with the SIRs of other cells in the same RLS, and the combined SIR is compared with the SIR_target; if the combined SIR is smaller than the SIR_target, a power control instruction is sent to instruct the UE to increase the transmission power; and if the combined SIR is greater than the SIR_target, a power control instruction is sent to instruct the UE to decrease the transmission power.

Figure 5:
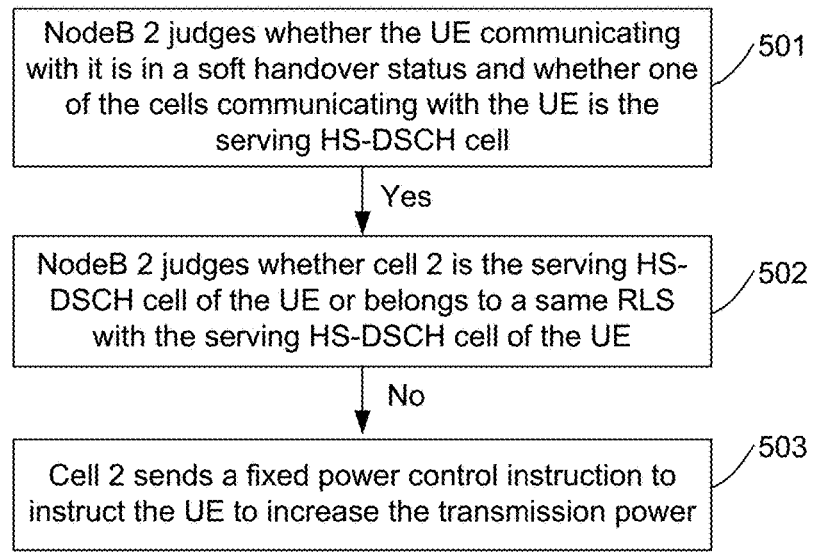
FIG. 5 is a diagram showing a specific implementing flow of a preferred embodiment of an inner loop and closed loop power control method based on a non-serving cell of UE shown in FIG. 3 in an embodiment of the disclosure.

FIG. 5 is a diagram showing a specific implementing flow of a preferred embodiment of an inner loop and closed loop power control method based on a non-serving cell of UE shown in FIG. 3 in an embodiment of the disclosure.

Step 501: NodeB2 judges whether the UE communicating with it is in a soft handover status and whether one of the cells communicating with the UE is a serving HS-DSCH cell.

Step 502: NodeB 2 judges whether cell 2 is the serving HS-DSCH cell of the UE or belongs to a same RLS with the serving HS-DSCH cell of the UE.

It should be noted that, when multiple cells (such as cell 2, cell Y and the like) in the NodeB2 communicate with the UE, here, NodeB2 judges whether cell 2, cell Y and the like are serving HS-DSCH cells of the UE or belong to a same RLS with the serving HS-DSCH cell of the UE one by one.

Step 503: When cell 2 (or cell 2, or cell Y and the like) is not the serving HS-DSCH cell of the UE and belongs to an RLS different from the serving HS-DSCH cell of the UE, cell 2 (or cell 2, or cell Y and the like) sends a fixed power control instruction to instruct the UE to increase the transmission power.

The UE may receive the power control instructions from cell 1 and cell 2 at the same time; according to the power control instruction combination principle in the existing inner loop and closed loop power control method, the power control instruction finally available to the UE is the power control instruction of cell 1 & the fixed power control instruction of cell 2; all the fixed power control instructions sent by cell 2 to the UE are for increasing the transmission power, therefore, the power control instruction finally available to the UE is the power control instruction of cell 1, and the UE adjusts the transmission power only according to the power control instruction of cell 1. When the uplink and the downlink are unbalanced, namely, when the difference between a DL1 signal and a DL2 signal in FIG. 3 does not exceed a cell switching threshold (the cell switching threshold is a tested experience value or a simulation value), and when the difference between a UL2 signal and a UL1 signal is greater than the cell switching threshold, the adverse effect of a non-serving cell (such as cell 2) on the UE (for example, the UE is continuously required to decrease the transmission power) can be limited by the method provided by the disclosure, the problem of unreliable decoding of an uplink control channel, particularly unreliable decoding of an HS-DPCCH, of the serving HS-DSCH cell (such as cell 1), is solved, and the QoS of HSDPA is improved. When the uplink and the downlink are balanced, namely, when both the difference between a DL1 signal and a DL2 signal and the difference between an UL1 signal and an UL2 signal in FIG. 3 do not exceed the cell switching threshold, no adverse effect can be caused to the power adjustment of the UE by the method provided in the disclosure. Therefore, another advantage of the disclosure is that the disclosure is suitable for any soft handover scenario, and it is unnecessary to judge whether the uplink and downlink are balanced, so the implementation is simple.

The disclosure has obvious beneficial effects when UE is in the soft handover status and when uplink and downlink are unbalanced, and thus is further described below through another embodiment.

Figure 6:
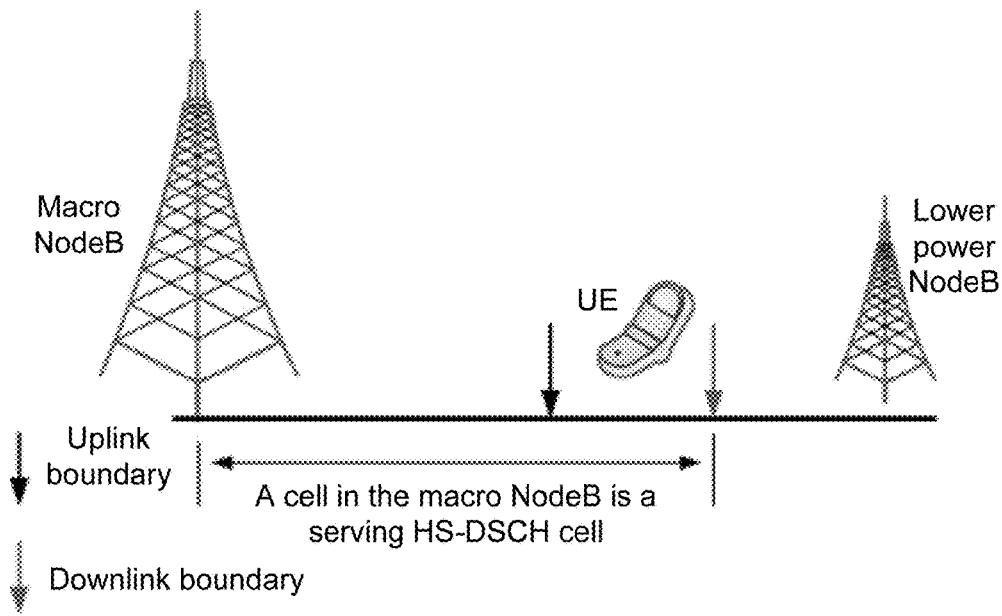
FIG. 6 is a diagram showing an execution example of a method for implementing inner loop and closed loop power control when an uplink and a downlink are unbalanced in an embodiment of the disclosure.
Figure 7:
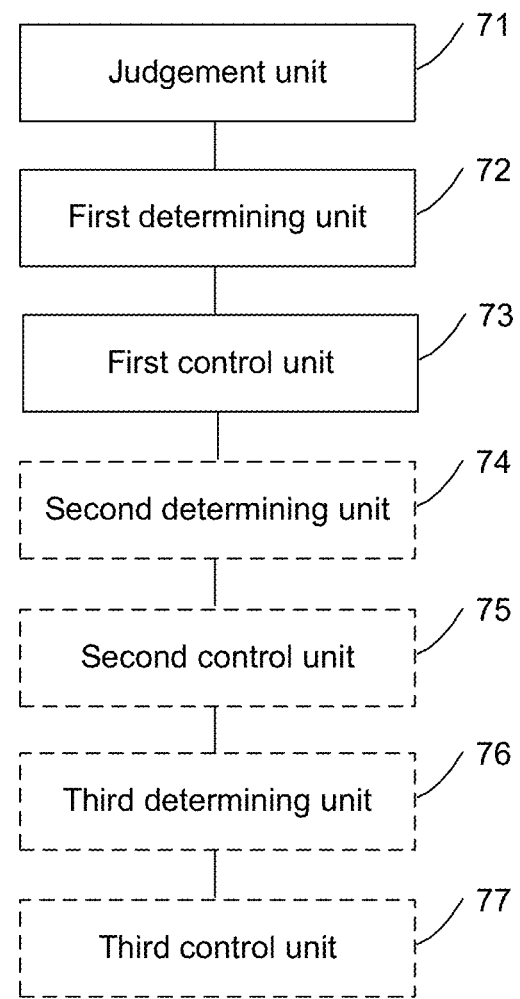
FIG. 7 is a diagram showing a composition structure of a base station provided by an embodiment of the disclosure.

FIG. 6 is a diagram showing an execution example of a method for implementing inner loop and closed loop power control when an uplink and a downlink are unbalanced in the disclosure. In a HetNet, when UE is in a soft handover area between a macro NodeB and a low power NodeB and when a cell in the macro NodeB is taken as a serving HS-DSCH cell, because the macro NodeB and the low power NodeB are quite different in transmission power (for example, the difference of the transmission power is usually 6 dB to 19 dB), when the UE is in the soft handover status, the signal from the UE to the low power NodeB is much better than that from the UE to the macro NodeB; according to the existing inner loop and closed loop power control method, the power control instruction from a cell in the low power NodeB continuously requires the UE to decrease the transmission power, accordingly, the error rate of the control channel from the UE to the cell in the macro NodeB, particularly the error rate of the HS-DPCCH, increases, and the QoS is affected seriously. According to the method provided by the disclosure, the low power NodeB determines that the UE communicating with the low power NodeB itself is in a soft handover status and one of the cells communicating with the UE is the serving HS-DSCH cell (the cell in the macro NodeB); moreover, the cell in the low power NodeB and the serving HS-DSCH cell of the UE do not belong to a same RLS, so the cell in the lower power NodeB sends a fixed power control instruction to instruct the UE to increase the transmission power; the macro NodeB determines that the UE communicating with the macro NodeB itself is in the soft handover status and the cell in the macro NodeB is the serving HS-DSCH cell of the UE, so the cell in the macro NodeB controls the power of the UE according to the existing inner loop power control method. After the power control instructions are combined, the UE adjusts power only according to the power control instruction from the cell in the macro NodeB, so the adverse effect on the power control of the cell in the lower power NodeB is limited (for example, the UE is continuously required to decrease the transmission power), the quality of signal from the UE to the cell in the macro NodeB is ensured, the problem of decoding error of the control channel from the UE to the cell in the macro NodeB, particularly that of the HS-DPCCH, is solved, and the QoS of HSDPA is ensured.

It should be noted that each step in FIGS. 2, 4 and 5 is executed by a corresponding functional module of the base station.

An embodiment of the disclosure provides a base station, as shown in FIG. 3, the base station includes a judgement unit 71, a first determining unit 72 and a first control unit 73, wherein the judgement unit 71 is configured to judge whether UE is in a soft handover status;

the first determining unit 72 is configured to, when the UE is in the soft handover status, determine a cell which belongs to an RLS different from that of the serving cell of the UE; and the first control unit 73 is configured to control the cell which belongs to an RLS different from that of the serving cell of the UE to send a fixed power control instruction to instruct the UE to increase the transmission power.

Preferably, the fixed power control instruction is irrelevant to a SIR actually measured and refers to a fixed power control instruction for instructing the UE to increase the transmission power.

Preferably, the base station further includes a second determining unit 74 and a second control unit 75, wherein the second determining unit 74 is configured to, when the UE is not in the soft handover status, determine a cell communicating with the UE;

the second control unit 75 is configured to, when the UE is not in the soft handover status, control a cell communicating with the UE to measure the SIR of an uplink DPCH in real time and compare the measured SIR with an SIR_target;

when the measured SIR is smaller than the SIR_target, control the cell communicating with the UE to send a power control instruction to instruct the UE to increase the transmission power, and when the measured SIR is greater than the SIR_target, control the cell communicating with the UE to send a power control instruction to instruct the UE to decrease the transmission power.

Preferably, the base station further includes a third determining unit 76 and a third control unit 77, wherein the third determining unit 76 is configured to, when the UE is in the soft handover status, determine whether a cell communicating with the UE is the serving cell of the UE or belongs to a same RLS with the serving cell of the UE; and the third control unit 77 is configured to, when the third determining unit 76 determines that the cell communicating with the UE is the serving cell of the UE or belongs to the same RLS with the serving cell of the UE, control the cell communicating with the UE to measure the SIR of an uplink DPCH in real time, combine the measured SIR with the SIRs of other cells in the RLS, and compare the combined SIR with the SIR_target;

when the combined SIR is smaller than the SIR_target, control the cell communicating with the UE to send a power control instruction to instruct the UE to increase the transmission power, and when the combined SIR is greater than the SIR_target, control the cell communicating with the UE to send a power control instruction to instruct the UE to decrease the transmission power.

In the actual application, all the judgement unit 71, the first determining unit 72, the first control unit 73, the second determining unit 74, the second control unit 75, the third determining unit 76 and the third control unit 77 can be implemented by a Central Processing Unit (CPU), a Digital Signal Processor (DSP), or a Field Programmable Gate Array (FPGA) of the base station.

An embodiment of the disclosure further records a computer storage medium, in which a computer program which is configured to execute the method for implementing inner loop and closed loop power control shown in FIG. 2 in the embodiment is stored.

What described above are only preferred embodiments of the disclosure and not intended to limit the scope of patent of the disclosure; and all the equivalent structure or equivalent flow change made by the description and drawings of the disclosure is directly or indirectly applied to the field of other related arts and also within the scope of the patent protection of the disclosure.

INDUSTRIAL APPLICABILITY

In the embodiments, when UE is in a soft handover status, a cell which belongs to an RLS different from that of a serving cell of the UE is controlled to send a fixed power control instruction to instruct the UE to increase the transmission power, so that the adverse effect of a non-serving cell on the UE is limited effectively, the problem of unreliable decoding of an uplink control channel, particularly that of an HS-DPCCH of a serving HS-DSCH cell is solved, and the QoS of HSDPA is improved.

What is claimed is:

1. A method for implementing inner loop and closed loop power control, comprising:
    judging whether a User Equipment (UE) is in a soft handover status;
    when the UE is in the soft handover status, sending, by a cell which belongs to a Radio Link Set (RLS) different from that of a serving cell of the UE, a fixed power control instruction to instruct the UE to increase transmission power.

2. The method according to claim 1, wherein the fixed power control instruction is irrelevant to a Signal-to-Interference Ratio (SIR) actually measured and refers to a fixed power control instruction for instructing the UE to increase the transmission power.

3. A non-transitory computer storage medium, storing a program including a computer executable instruction configured to execute the method according to claim 2.

4. The method according to claim 1, further comprising:
    when the UE is not in the soft handover status, measuring, by a cell communicating with the UE, a SIR of an uplink Dedicated Physical Channel (DPCH) in real time and comparing the measured SIR with a target SIR;
    when the measured SIR is smaller than the target SIR, sending, by the cell communicating with the UE, a power control instruction to instruct the UE to increase the transmission power, and
    when the measured SIR is greater than the target SIR, sending, by the cell communicating with the UE, a power control instruction to instruct the UE to decrease the transmission power.

5. A non-transitory computer storage medium, storing a program including a computer executable instruction configured to execute the method according to claim 4.

6. The method according to claim 1, further comprising:
    when the UE is in the soft handover status, if a cell communicating with the UE is the serving cell of the UE or belongs to a same RLS with the serving cell of the UE, then measuring, by the cell communicating with the UE, a SIR of an uplink DPCH in real time, combining the measured SIR with SIRs of other cells in the same RLS, and comparing the combined SIR with a target SIR;
    when the combined SIR is smaller than the target SIR, sending, by the cell communicating with the UE, a power control instruction to instruct the UE to increase the transmission power, and
    when the combined SIR is greater than the target SIR, sending, by the cell communicating with the UE, a power control instruction to instruct the UE to decrease the transmission power.

7. A non-transitory computer storage medium, storing a program including a computer executable instruction configured to execute the method according to claim 6.

8. A non-transitory computer storage medium, storing a program including a computer executable instruction configured to execute the method according to claim 1.

9. A base station for implementing inner loop and closed loop power control, comprising a judgement unit, a first determining unit and a first control unit, wherein
    the judgement unit is configured to judge whether a User Equipment (UE) is in a soft handover status;
    the first determining unit is configured to, when the UE is in the soft handover status, determine a cell which belongs to an RLS different from that of a serving cell of the UE; and
    the first control unit is configured to control the cell which belongs to the RLS different from that of the serving cell of the UE to send a fixed power control instruction to instruct the UE to increase the transmission power.

10. The base station according to claim 9, wherein the fixed power control instruction is irrelevant to a Signal-to-Interference Ratio (SIR) actually measured and refers to a fixed power control instruction for instructing the UE to increase the transmission power.

11. The base station according to claim 9, further comprising a second determining unit and a second control unit, wherein
the second determining unit is configured to, when the UE is not in the soft handover status, determine a cell communicating with the UE; and
the second control unit is configured to, when the UE is not in the soft handover status, control the cell communicating with the UE to measure a SIR of an uplink Dedicated Physical Channel (DPCH) in real time and compare the measured SIR with a target SIR;
when the measured SIR is smaller than the target SIR, control the cell communicating with the UE to send a power control instruction to instruct the UE to increase the transmission power, and
when the measured SIR is greater than the target SIR, control the cell communicating with the UE to send a power control instruction to instruct the UE to decrease the transmission power.

12. The base station according to claim 9, further comprising a third determining unit and a third control unit, wherein
the third determining unit is configured to, when the UE is in the soft handover status, determine whether a cell communicating with the UE is the serving cell of the UE or belongs to a same RLS with the serving cell of the UE; and
the third control unit is configured to, when the third determining unit determines that the cell communicating with the UE is the serving cell of the UE or belongs to the same RLS with the serving cell of the UE, control the cell communicating with the UE to measure a SIR of an uplink DPCH in real time, combine the measured SIR with SIRs of other cells in the same RLS, and compare the combined SIR with a target SIR;
when the combined SIR is smaller than the target SIR, control the cell communicating with the UE to send a power control instruction to instruct the UE to increase the transmission power, and
when the combined SIR is greater than the target SIR, control the cell communicating with the UE to send a power control instruction to instruct the UE to decrease the transmission power.

\* \* \* \* \*